United States Patent
Cervinka et al.

(10) Patent No.: US 11,756,426 B2
(45) Date of Patent: Sep. 12, 2023

(54) METHOD AND SYSTEM FOR ACKNOWLEDGING PRESENCE IN A CONTEXT-AWARE ENVIRONMENT

(71) Applicant: NEWTRAX HOLDINGS INC., Montreal (CA)

(72) Inventors: Alexandre Cervinka, Montreal (CA); Martin Bouchard, Montreal (CA)

(73) Assignee: NEWTRAX HOLDINGS INC, Quebec (CA)

( * ) Notice: Subject to any disclaimer, the term of this patent is extended or adjusted under 35 U.S.C. 154(b) by 0 days.

(21) Appl. No.: 17/261,669

(22) PCT Filed: Jul. 23, 2019

(86) PCT No.: PCT/CA2019/051016
§ 371 (c)(1),
(2) Date: Jan. 20, 2021

(87) PCT Pub. No.: WO2020/019071
PCT Pub. Date: Jan. 30, 2020

(65) Prior Publication Data
US 2021/0272461 A1      Sep. 2, 2021

Related U.S. Application Data

(60) Provisional application No. 62/702,313, filed on Jul. 23, 2018.

(51) Int. Cl.
*G08G 1/16*      (2006.01)
*H04W 4/40*      (2018.01)
*G08B 5/38*      (2006.01)

(52) U.S. Cl.
CPC ............... *G08G 1/163* (2013.01); *G08B 5/38* (2013.01); *G08G 1/166* (2013.01); *H04W 4/40* (2018.02)

(58) Field of Classification Search
CPC ......... G08G 1/163; G08G 1/166; H04W 4/40; G08B 5/38
(Continued)

(56) References Cited

U.S. PATENT DOCUMENTS 5,568,121 A * 10/1996 Lamensdorf ......... G08B 25/016
340/502
9,081,046 B2 * 7/2015 Frederick ............... G08B 21/22
(Continued)

FOREIGN PATENT DOCUMENTS

CN      102963326 A      3/2013
WO      2017089954 A1      6/2017

*Primary Examiner* — Kerri L McNally
*Assistant Examiner* — Thang D Tran
(74) *Attorney, Agent, or Firm* — Corinne R. Gorski

(57) ABSTRACT

A method for acknowledging presence in a context-aware environment includes the steps of detecting, with at least one context awareness mechanism, if a context-aware device is within a predetermined range or distance. The method further includes, that when the vehicle device or personal device is within a range of the moving vehicle, sending a request of acknowledgment to the vehicle device or personal device. In events where the moving vehicle device does not receive an acknowledgment from another vehicle or a worker within a predetermined duration, the moving vehicle is automatically stopped. In events where the moving vehicle device receives an acknowledgment from all the devices within the predetermined range, the device of the moving vehicle considers the context as non-hazardous and the vehicle may continue along its path.

12 Claims, 7 Drawing Sheets

(58) Field of Classification Search
USPC .......................................................... 340/901
See application file for complete search history.

(56) References Cited

U.S. PATENT DOCUMENTS

| | | | | |
|---|---|---|---|---|
| 9,566,908 B2* | 2/2017 | Croteau | ................ | B60Q 9/008 |
| 2002/0064660 A1* | 5/2002 | Janes | ...................... | B60J 10/17 |
| | | | | 428/327 |
| 2008/0154712 A1* | 6/2008 | Wellman | ............. | B66F 9/07581 |
| | | | | 705/7.26 |
| 2009/0322512 A1* | 12/2009 | Frederick | ................ | G08B 7/06 |
| | | | | 340/539.11 |
| 2011/0024911 A1 | 2/2011 | Shibuya et al. | | |
| 2011/0128161 A1* | 6/2011 | Bae | ........................ | B60Q 5/006 |
| | | | | 340/901 |
| 2011/0249118 A1* | 10/2011 | Bruno | ............... | B60W 30/0953 |
| | | | | 348/148 |
| 2012/0025964 A1* | 2/2012 | Beggs | ..................... | G08B 6/00 |
| | | | | 340/435 |
| 2013/0038320 A1* | 2/2013 | Frederick | ............... | G08B 21/22 |
| | | | | 324/207.13 |
| 2013/0054127 A1* | 2/2013 | Yamashiro | ............. | G08G 1/163 |
| | | | | 701/300 |
| 2013/0060458 A1* | 3/2013 | Makela | ................. | G01S 17/931 |
| | | | | 701/301 |
| 2014/0009275 A1* | 1/2014 | Bowers | .................... | B60Q 1/00 |
| | | | | 340/436 |
| 2014/0077961 A1* | 3/2014 | Frederick | ............... | G08B 21/02 |
| | | | | 340/686.6 |
| 2014/0114502 A1* | 4/2014 | Hugron | .................. | G07C 5/008 |
| | | | | 701/1 |
| 2014/0139356 A1* | 5/2014 | Vaguin | ................... | G08B 21/02 |
| | | | | 340/905 |
| 2014/0218186 A1* | 8/2014 | Kawamoto | ............. | B60R 25/10 |
| | | | | 340/426.1 |
| 2015/0035685 A1* | 2/2015 | Strickland | .............. | B60Q 1/525 |
| | | | | 340/901 |
| 2015/0046022 A1* | 2/2015 | Bai | ........................ | G07C 5/008 |
| | | | | 701/461 |
| 2015/0091740 A1* | 4/2015 | Bai | ........................ | G08G 1/005 |
| | | | | 340/901 |
| 2015/0228195 A1* | 8/2015 | Beaurepaire | ......... | G08G 1/0962 |
| | | | | 340/907 |
| 2015/0253776 A1* | 9/2015 | Tojima | .................. | G05D 1/0278 |
| | | | | 701/50 |
| 2015/0274072 A1* | 10/2015 | Croteau | ................ | B60Q 9/008 |
| | | | | 340/903 |
| 2015/0307024 A1* | 10/2015 | Fukuda | .................. | B60Q 9/008 |
| | | | | 382/103 |
| 2016/0224029 A1* | 8/2016 | Tojima | .................. | G05D 1/0297 |
| 2016/0351054 A1* | 12/2016 | Zhang | ................... | H04W 4/029 |
| 2017/0092126 A1* | 3/2017 | Oshida | ................... | G08G 1/005 |
| 2017/0105106 A1* | 4/2017 | Tsai | ...................... | G06F 21/552 |
| 2017/0120816 A1* | 5/2017 | Croteau | ................ | B60Q 9/008 |
| 2017/0243490 A1* | 8/2017 | Leppänen | .............. | G08G 1/166 |
| 2017/0278385 A1* | 9/2017 | Jevne | ........................ | F16P 3/14 |
| 2017/0280384 A1* | 9/2017 | Denzel | .............. | H04W 52/0254 |
| 2017/0372563 A1* | 12/2017 | Sick | ..................... | G06Q 10/0631 |
| 2018/0079414 A1* | 3/2018 | Tellis | .................... | B60W 50/12 |
| 2018/0122218 A1* | 5/2018 | Shanley | .................. | E02F 9/262 |
| 2018/0165965 A1* | 6/2018 | Ewert | .................... | H04W 4/40 |
| 2018/0203130 A1* | 7/2018 | Neubecker | .............. | G01S 19/05 |
| 2018/0203455 A1* | 7/2018 | Cronin | ............... | B60W 60/0011 |
| 2018/0284293 A1* | 10/2018 | Pan | .......................... | G01S 19/45 |
| 2018/0338229 A1* | 11/2018 | Nemec | ................... | G06Q 50/30 |
| 2019/0043362 A1* | 2/2019 | Morimura | ............... | G06N 5/04 |
| 2019/0043363 A1* | 2/2019 | Morimura | ............... | B60Q 1/543 |
| 2019/0171218 A1* | 6/2019 | Hammond | ............ | B60W 30/09 |
| 2020/0229144 A1* | 7/2020 | Bharadwaj | .......... | H04W 72/044 |
| 2021/0306979 A1* | 9/2021 | Choi | ....................... | H04L 5/0051 |
| 2022/0022013 A1* | 1/2022 | Balasu | ................. | G06V 40/161 |

\* cited by examiner

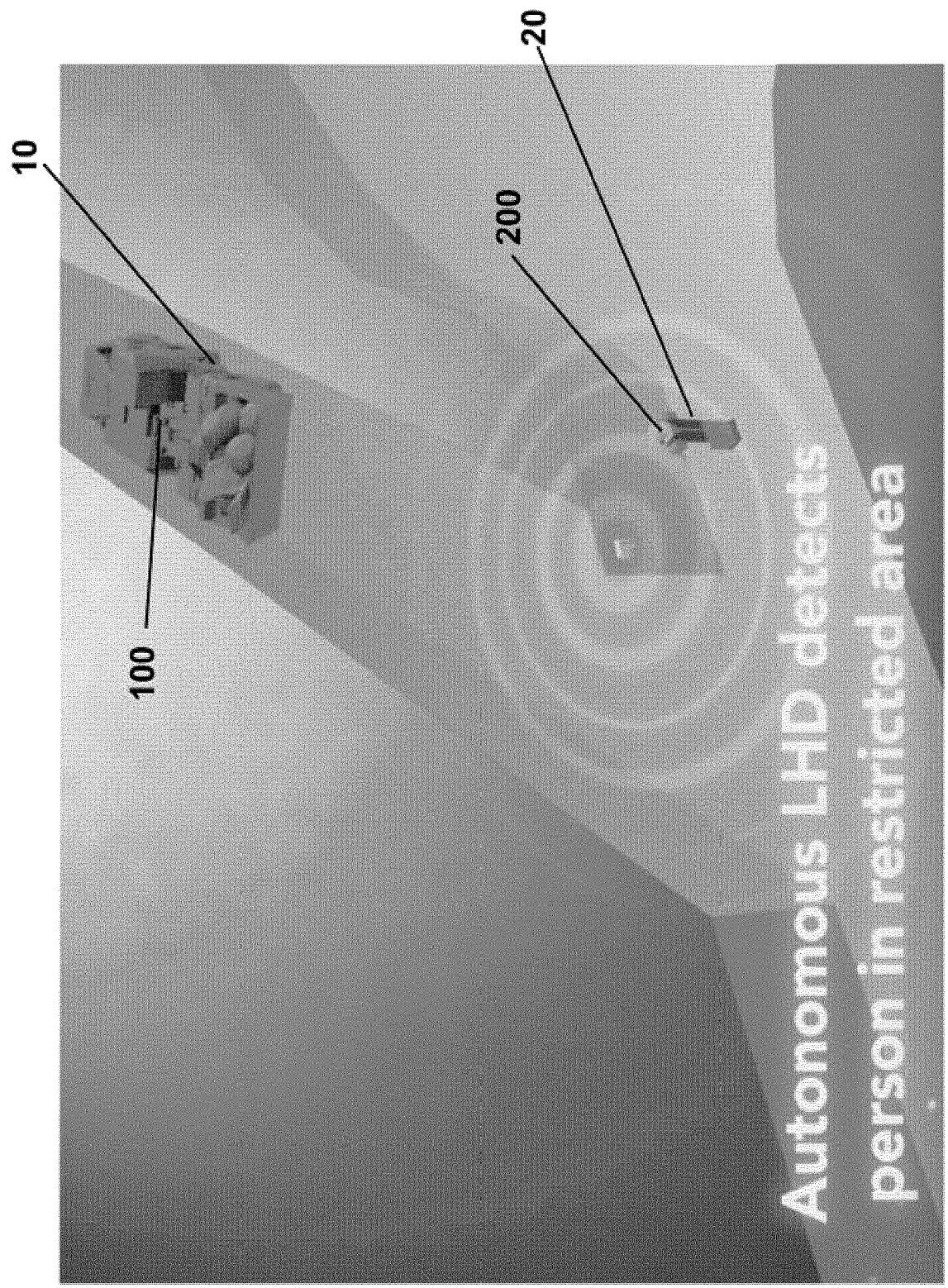
FIG. 1A - PRIOR ART

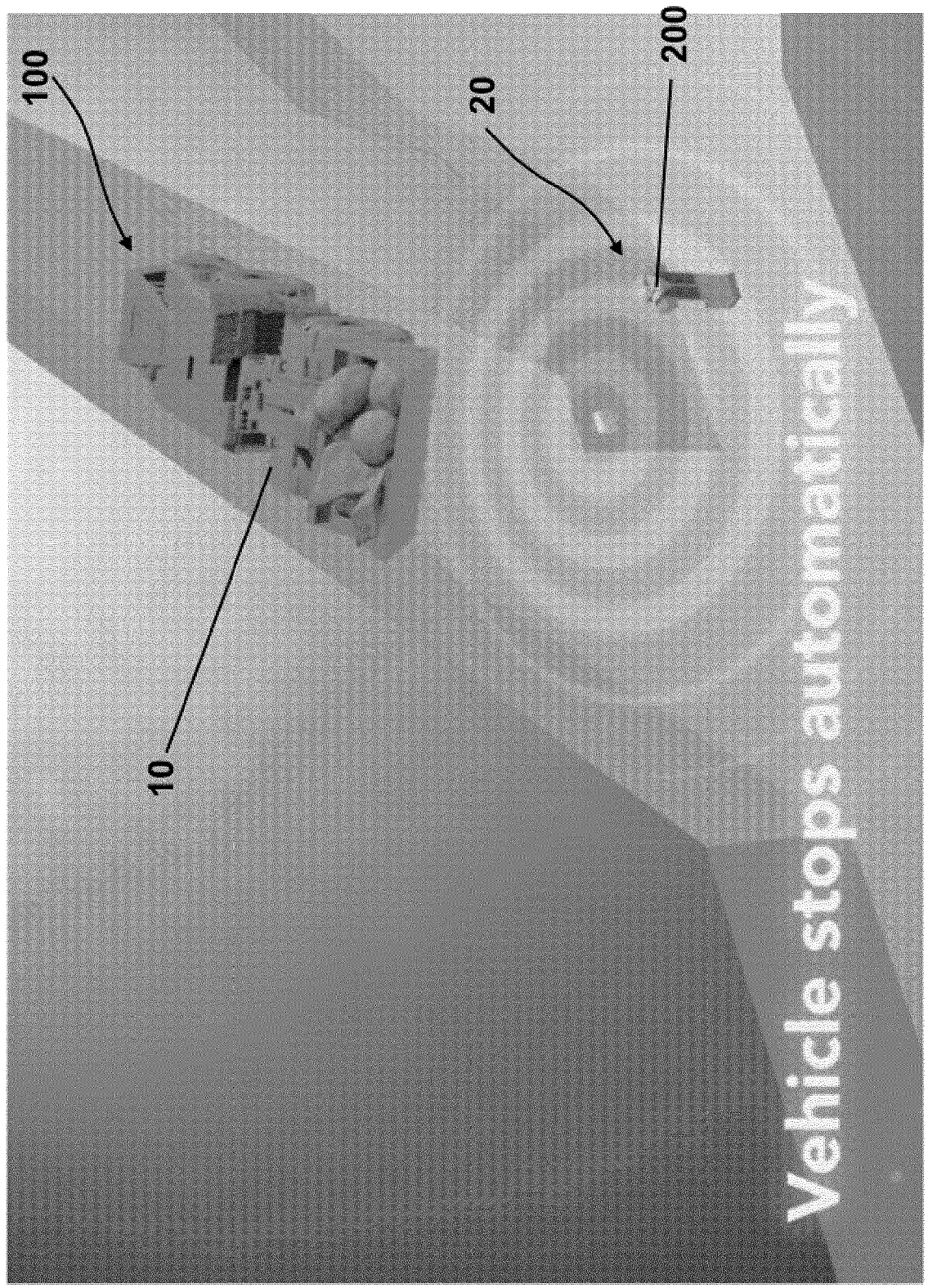
FIG. 1B - PRIOR ART

METHOD AND SYSTEM FOR ACKNOWLEDGING PRESENCE IN A CONTEXT-AWARE ENVIRONMENT

RELATED APPLICATION DATA

This application is a § 371 National Stage Application of PCT International Application No. PCT/CA2019/051016 filed Jul. 23, 2019 claiming priority to U.S. 62/702,313 filed Jul. 23, 2018.

CROSS-REFERENCE TO RELATED APPLICATIONS

The present patent application claims the benefits of priority of U.S. Provisional Patent Application No. 62/702, 313, entitled "Method and system for acknowledging presence in a context-aware environment" and filed at the United States Patent and Trademark Office on Jul. 23, 2019, the content of which is incorporated herein.

FIELD OF THE INVENTION

The present invention generally relates to the field of safety devices, apparatuses and/or systems and more particularly to the field of proximity warning and collision avoidance devices, apparatuses and/or systems typically used in mining environments or enclosed environments.

BACKGROUND OF THE INVENTION

Numerous underground mines are developed and are in operation throughout the world. Though safety measures are typically deployed to prevent accidents involving collisions between vehicles, machines, personnel and/or obstacles in these mines, accidents unfortunately happen on a regular basis.

To minimize the risks of collisions, collision avoidance systems are increasingly deployed. These systems come in various configurations and use various technologies, all with their inherent advantages and drawbacks.

One type of collision avoidance systems that is becoming popular in underground mine environments involves the use of typically three types of collision avoidance devices configured to be respectively mounted to vehicles, personnel, and obstacles. These devices are configured to form ad hoc peer-to-peer wireless networks when they are within communication range of each other and can therefore transmit proximity warnings to each other if proximity is detected from various sensors based on received signal strength, time-of-flight, radar, lasers or magnetic fields.

However, even if these types of collision avoidance systems can provide valuable warnings to enhance safety at mine sites, it remains that these systems do not take into account the context in which the person or the vehicle carrying the device is before transmitting proximity warnings. Hence, these systems often cause the transmission of proximity warnings even though the context does not warrant it.

Non-limitative examples of non-hazardous proximity warnings include the notification to a vehicle operator of personnel in the area when personnel are passengers in the same or another vehicle, the notification to a vehicle operator of personnel in the area when personnel are in a refuge or other sheltered area, the notification to a vehicle operator of vehicles in the area when the vehicles are parked in a garage, and the notification to personnel of a vehicle in the area when the vehicle is stopped or non-operating.

Even if context-aware avoidance systems provide ability to distinguish between non-hazardous situations, hazardous situations, and very hazardous or critical situations, some situations may be safe despite the system identifying a context of a hazardous, very hazardous or critical situations. As an example, in a situation where a person, such as a miner, is within a predetermined range of a moving vehicle, the vehicle will automatically stop, even if the person is in a safe environment. Such situation may occur when a person is being in an enclosure but still identified within the range of the vehicle. Such situation may happen many times a day in a mining environment and thus may result in important efficiency losses.

Hence, in view of the foregoing, there is a need for an improved collision avoidance system, and related devices and methods, purpose-built for underground mines which will at least mitigate some of the shortcomings of systems using collision avoidance devices.

SUMMARY OF THE INVENTION

The shortcomings of the prior art are generally mitigated by a method for acknowledging presence in a context-aware environment comprises the steps of detecting, with at least one context awareness mechanism, if a context-aware device is within a predetermined range or distance. The method further comprises the vehicle device or personal device being within a range of the moving vehicle sending a request of acknowledgment to the vehicle device or personal device. In events where the moving vehicle device does not receive an acknowledgment from another vehicle or a worker within a predetermined duration, the moving vehicle is automatically stopped. In events where the moving vehicle device receives an acknowledgment from all the devices within the predetermined range, the device of the moving vehicle considers the context as non-hazardous and the vehicle may continue along its path.

In another aspect of the invention, a system for acknowledging presence in a context-aware environment is provided. The system comprises a plurality of context-aware collision avoidance devices configured to connect with each another through a network, such as through a peer-to-peer network. Moving vehicles comprise vehicle devices configured to send acknowledgment requests to all other devices within a range of the path of the vehicle. Each device receiving the acknowledgment request is configured for an operator to communicate an acknowledgement response when the operator, such as a pedestrian or passengers of a vehicle, considers that they are in a safe area. Upon reception of the acknowledgment response, the moving vehicle is configured to move in proximity of the devices having acknowledged without automatically stopping.

In one aspect of the invention, a method for acknowledging presence of a first context-aware device using a second context-aware device in a context-aware environment is provided. The method comprises detecting with the second context-aware device if the first context-aware device is within a predetermined distance of the second context-aware device, when the first context-aware device is detected within the predetermined distance, the second context-aware device sending a request of acknowledgment to the first context-aware device, if in a safe environment, the first context-aware device sending an acknowledgment to the second context-aware device and upon reception of the acknowledgement from the first context-aware device, the second context-aware considering the context as non-hazardous.

The method may further comprise that if no acknowledgement is received after a predetermined duration from the second context-aware device sending the request of acknowledgment to the first context-aware device, the context being identified as critically hazardous.

The method may further comprise upon not receiving acknowledgement prior to a duration prior to predetermined duration, the context being identified as hazardous. The method may further comprise the second context-aware device sending another acknowledgement request to the first context-aware device prior to the end of the predetermined duration.

The second context-aware device may be in movement. The method may further comprise stopping the movement when the context is critically hazardous.

The second context-aware device may be in a vehicle. The method may further comprise automatically stopping the vehicle when the context is hazardous. The method may further comprise continuing movement of the vehicle when the context is non-hazardous. The method may further comprise slowing movement of the vehicle when the context is hazardous.

The method may further comprise calculating the distance between the moving second context-aware device and the first context-aware device.

The first context-aware device may be in a vehicle or may be worn by a person.

The context-aware environment may comprise a plurality of first context-aware devices, upon the second context-aware device receiving an acknowledgment from each of the first context-aware devices within the predetermined distance, the context being non-hazardous. The method may further comprise displaying time remaining for receiving the acknowledgment from each of the first context-aware devices.

In another aspect of the invention, a system for acknowledging presence in a context-aware environment is provided. The system comprises a network and a plurality of context-aware devices comprising at least one first context-aware device configured to be in communication with the other context-aware devices through the network, the first context-aware device being configured to send an acknowledgement to another context-aware device. The context-aware devices further comprise at least one second context-aware device configured to be in communication with the other context-aware devices through the network, wherein the first context-aware device is configured to send an acknowledgement to the second context-aware device and wherein the second context-aware device is configured to detect presence of the first context-aware device within a predetermined distance of the second context-aware device and upon reception of the acknowledgement from the first context-aware device, consider the context as non-hazardous.

The second context-aware may further be configured that if no acknowledgement is received after a predetermined duration from the second context-aware device sending the request of acknowledgment to the first context-aware device, the context being critically hazardous. The second context-aware device may be within a vehicle or the vehicle may be configured to automatically stop when the context is critically hazardous.

The second context-aware device may be configured to identify the context as hazardous upon not receiving the acknowledgement prior a predetermined duration. The second context-aware device being within a vehicle and the vehicle being configured to automatically slow down when the context is hazardous.

The first context-aware device may be within a vehicle. The vehicle may comprise an interface configured to display the reception of the acknowledgment request. The interface may be configured to trigger the communication of a response to the received acknowledgement request.

The second context-aware device may use radio-frequency communication range to detect the first context-aware device. The first context-aware device may be further configured to generate an alarm when receiving a notification of an approaching second context-aware device.

The first context-aware device may be integrated into a cap lamp. The cap lamp being may be configured to flash when the first context-aware device receives the acknowledgement request from the second context-aware device. The cap lamp may be configured to be toggled on or off, the toggle of the cap lamp triggering the first context-aware device to send the acknowledgement to the received acknowledgement request.

The system may comprise a plurality of first context-aware devices, the second context-aware device being configured to identify the context as being non-hazardous upon receiving an acknowledgment from each of the first context-aware devices.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIGS. 1A and 1B are illustrations of a prior art system for detecting a person in a restricted area.

DETAILED DESCRIPTION OF THE PREFERRED EMBODIMENT

Figure 2:
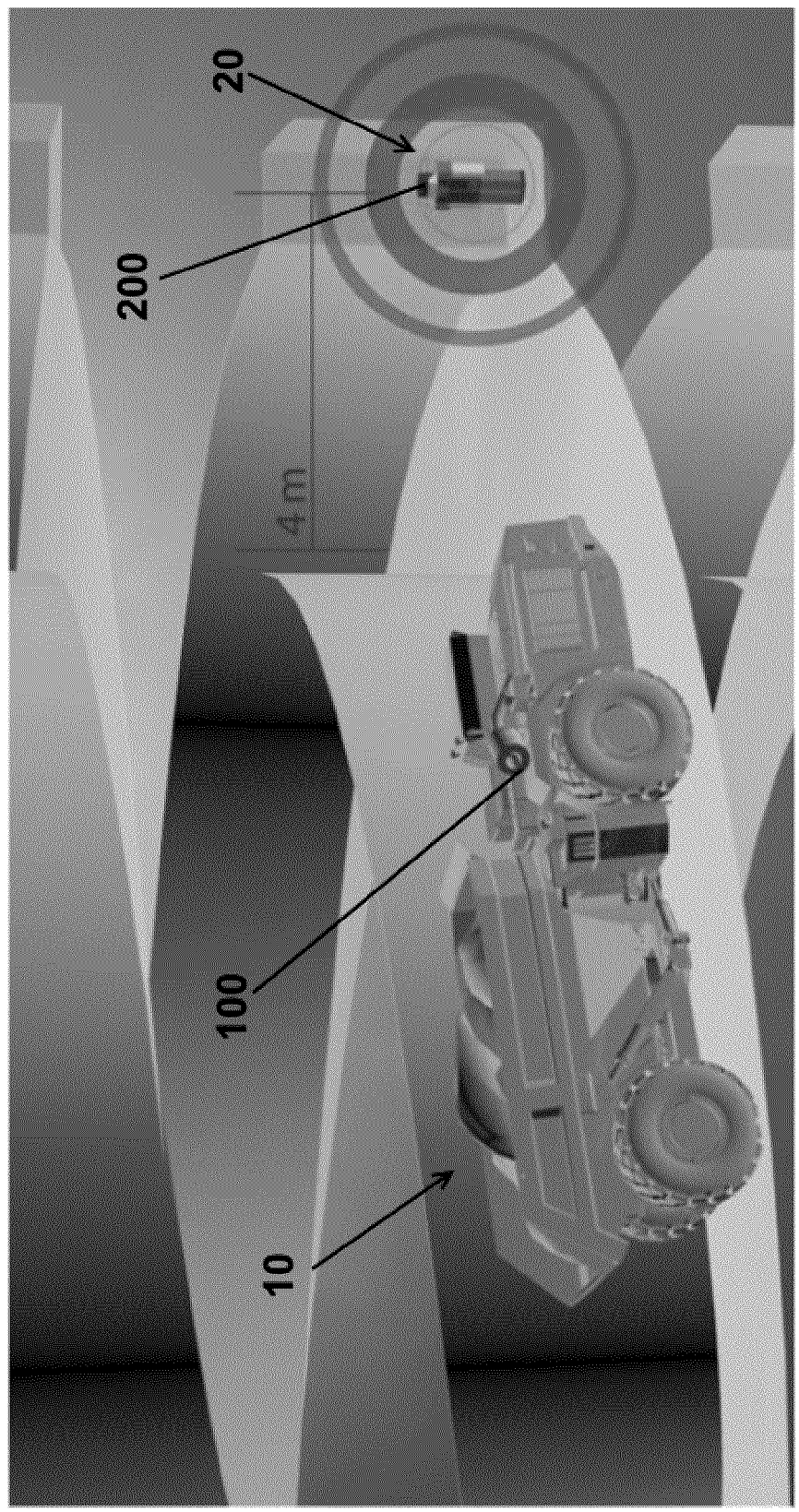
FIG. 2 is an illustration of detection of a person in an embodiment of a method for acknowledging presence in a context-aware environment.
Figure 3:
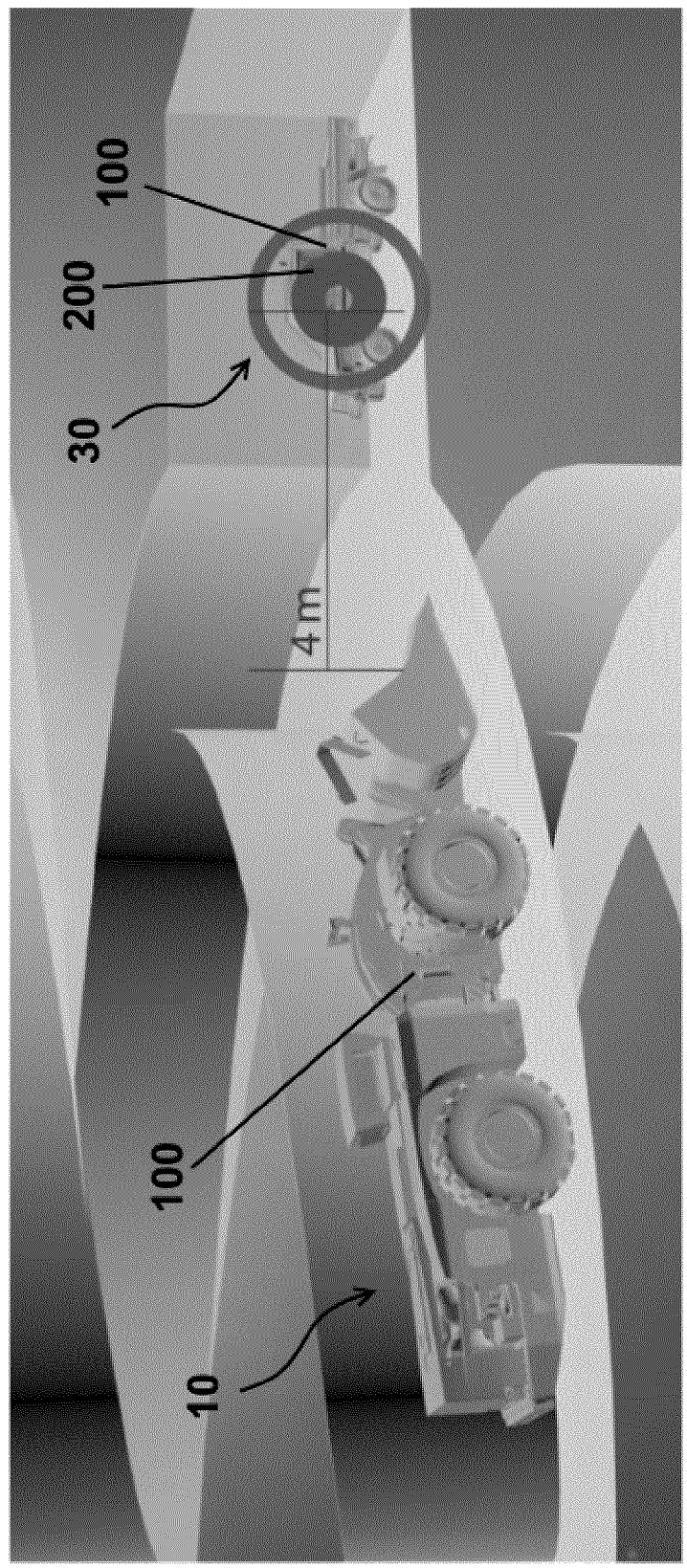
FIG. 3 is an illustration of detection of a vehicle in an embodiment of a method for acknowledging presence in a context-aware environment.

A novel method and system for acknowledging presence in a context-aware environment will be described hereinafter. Although the invention is described in terms of specific illustrative embodiments, it is to be understood that the embodiments described herein are by way of example only and that the scope of the invention is not intended to be limited thereby.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

The context-aware collision avoidance devices referred to in the context of the present invention are generally deployed within collision avoidance systems of the type comprising different types of devices configured to be respectively mounted to, or carried by, mobile vehicles and machinery, fixed hazards or obstacles, and personnel, such as devices and system disclosed in US patent application published under no. US 2015/0274072 A1, the content of which is incorporated herein.

Typically, such collision avoidance systems comprise three types of devices, namely: 1) vehicle devices to be mounted to mobile vehicles and machinery (collectively referred to as "vehicles"), 2) obstacle devices to be mounted to obstacle and other fixed hazards (collectively referred to as "obstacles"), and 3) personnel devices to be carried by personnel (e.g. vehicle operators, worker, miners, etc.).

In operation, the various devices will communicate with each other directly (e.g. through peer-to-peer network(s)) or indirectly (e.g. through communication network(s)). Once in communication, the various devices will be able to transmit proximity warnings to each other when proximity is detected with the help of various methodologies (e.g. communication range, received signal strength, time of flight, radar, magnetic fields, laser-based location recognition, etc.).

Referring now to FIGS. 1A and 1B, in typical prior art scenario using a system of context-aware collision avoidance devices is illustrated. In such scenario, which is located in an underground mine, a vehicle equipped with at least one vehicle device 100 circulates in direction of a person or worker 20 equipped with a personnel device 200 (see FIG. 1A). The vehicle device 100 is configured to detect other context-aware device within a certain range and to automatically stop when the vehicle 10 is within a predetermined distance of another vehicle device 10 or person device 20 (see FIG. 1B).

Such exemplary system has some drawback. Amongst others, in the scenario shown in FIGS. 1A and 1B, even if the worker 20 is in a safe environment, but within a predetermined range of the vehicle 10 considered critically hazardous, the vehicle 10 will automatically stops upon detection of the worker 20 within the predetermined range. The workers 20 must then move out of the critically hazardous range for the vehicle 10 to move forward, resulting in lost of time and in reduced efficiency. In some other situations, the unexpected and sudden stop of the vehicle 10 may eject an operator out of the vehicle 10 if the said operator has not fastened his seatbelt. Such situation may again reduce efficiency and may obviously even lead to serious injuries.

Referring now to FIGS. 2 to 6, a method for acknowledging presence in a context-aware environment is illustrated. The method generally comprises the steps of detecting, with at least one context awareness mechanism, if a context-aware device 100, 200 is within a predetermined range or distance (see FIGS. 2 and 3). The method further comprises the vehicle device 100 or personal device 200 being within a predetermined range of the moving vehicle 10 sending a request of acknowledgment to the vehicle device 100 or personal device 200 (see FIG. 4). In events where the moving vehicle device 100 does not receive an acknowledgment from another vehicle 30 or a worker 10 within a predetermined duration, the moving vehicle 10 is automatically stopped (see FIG. 5). In events where the moving vehicle device 100 receives an acknowledgment from all the devices 100 and 200 within the predetermined range, the device 100 of the moving vehicle considers the context as non-hazardous and the vehicle 10 may continue along its path (see FIG. 6).

Referring back to FIGS. 2 and 3, the method may further comprise detecting a one or more context-aware devices within predetermined ranges. A context may be associated with each of the ranges. As examples, the context may be that the moving vehicle 10 is moving toward a predetermined hazardous range of the person 20 or another vehicle 30. In such context, the acknowledgment request is sent to each device having a predetermined range which shall be crossed by the moving vehicle.

Figure 4:
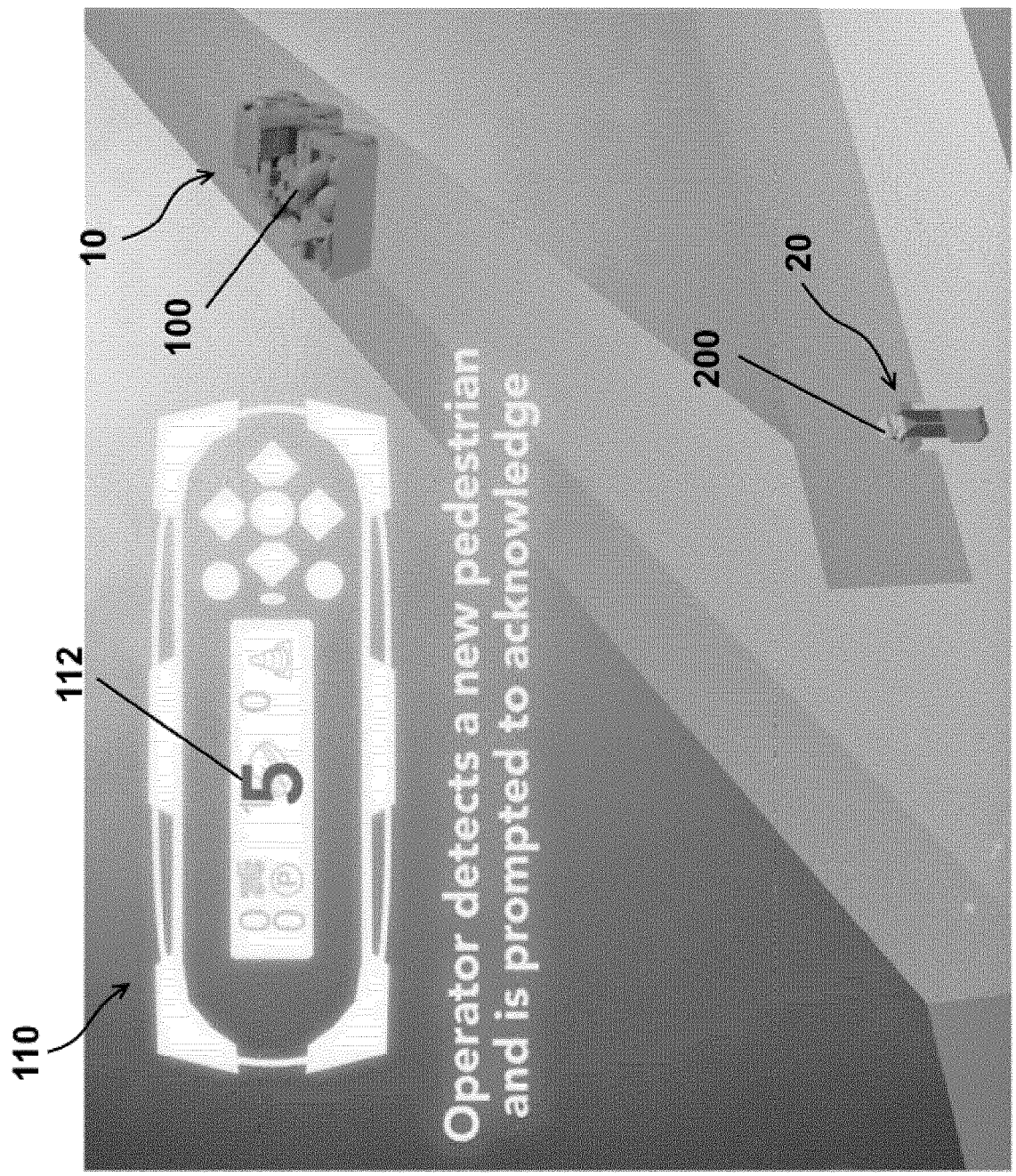
FIG. 4 is an illustration of prompting for acknowledgment of a person in an embodiment of a method for acknowledging presence in a context-aware environment.

Referring now to FIG. 4, the moving vehicle 10 may comprise an interface 110 showing the other devices 100, 200 within a predetermined range. The step of sending a request of acknowledgment to each device within the predetermined range may further comprise displaying the time 112 remaining for receiving the acknowledgment from each of the devices 100, 200 presents within a predetermined range. The step of sending a request of acknowledgment may further comprise calculating the distance between the moving vehicle 10 and the different devices 100, 200 being part of the same network.

In some embodiments, the various devices 100, 200 communicate with each other directly (e.g. through peer-to-peer network(s)) or indirectly (e.g. through communication network(s)). Once in communication, the various devices will be able to transmit proximity warnings to each other when proximity is detected with the help of various methodologies (e.g. communication range, received signal strength, time of flight, radar, magnetic fields, laser-based location recognition, etc.).

In the present embodiment, the various devices 100, 200 communicate directly with each other via peer-to-peer communication. Also, in the present embodiment, proximity between devices 100, 200 is mainly detected by the radio-frequency communication range between various devices. In that sense, in the present embodiment, the range of proximity detection may vary from as low as 25 meters when devices are around corners with no direct line-of-sight, to up to 100 meters when devices have a direct line-of-sight.

Figure 5:
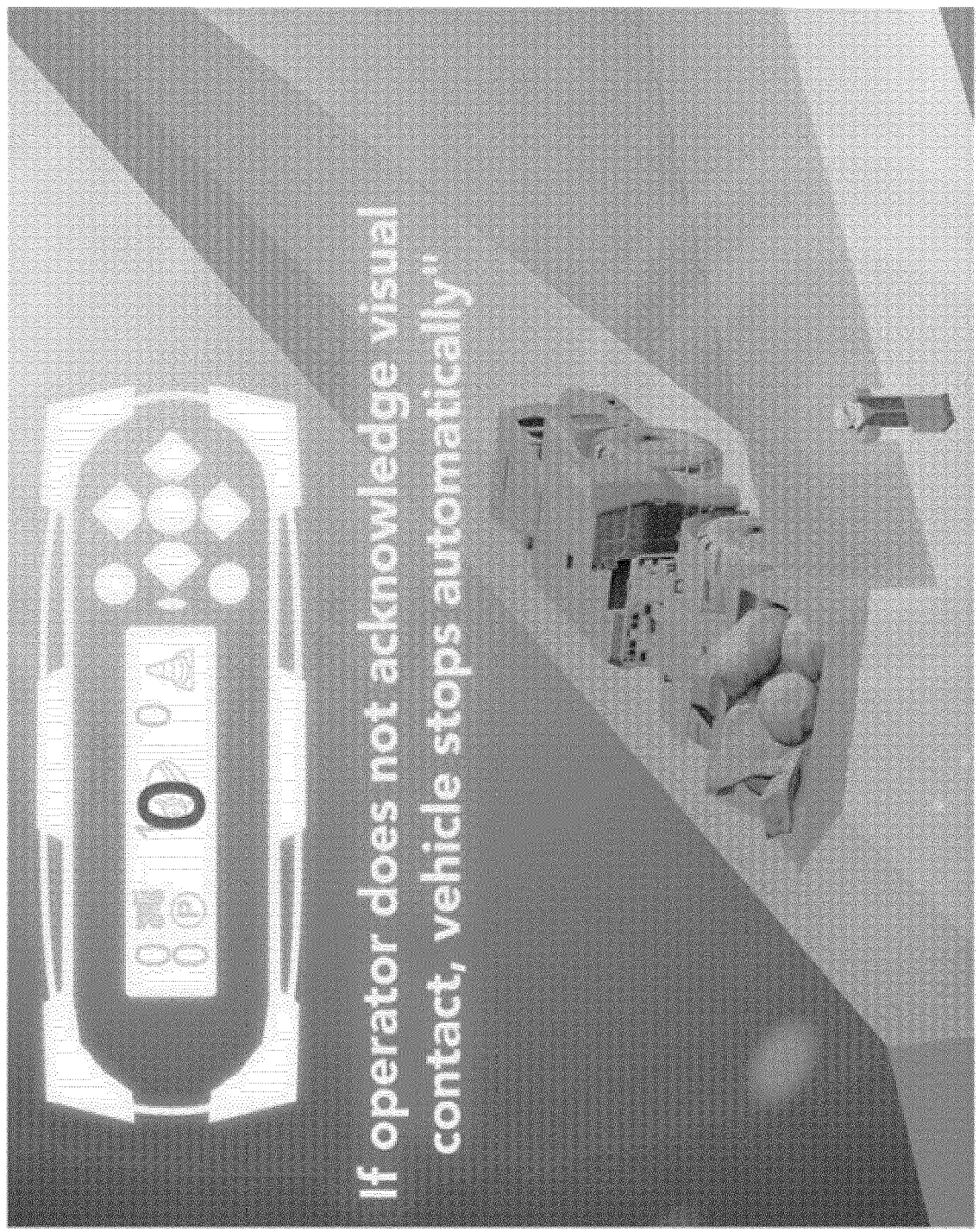
FIG. 5 is an illustration of non-acknowledgment of a person in an embodiment of a method for acknowledging presence in a context-aware environment.

Now referring to FIG. 5, if a person 20 or a vehicle 30 requested to acknowledge within a predetermined duration does not send an acknowledgment response to the device 100 of the moving vehicles 10, the moving vehicle 10 is configured to be automatically stopped.

In some embodiments, the moving vehicle 10 may be configured to automatically slow down close to the end of the duration of the period to receive an acknowledgment from the devices 100, 200.

Figure 6:
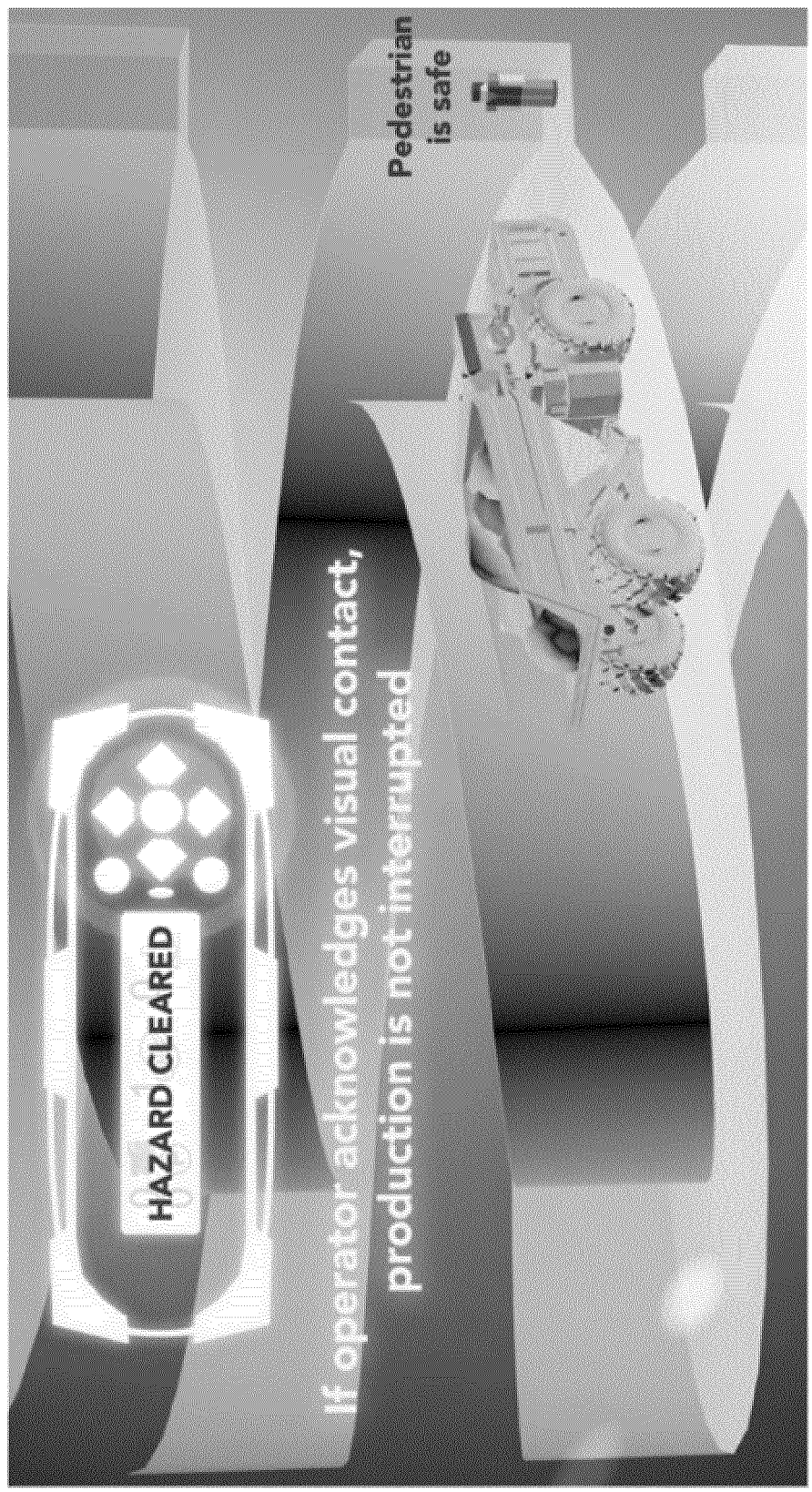
FIG. 6 is an illustration of acknowledgment of a person in an embodiment of a method for acknowledging presence in a context-aware environment.

Now referring to FIG. 6, if all of the devices 100, 200 within the predetermined range and having been sent an acknowledgment request do send an acknowledgment response to the device 100 of the moving vehicle 10, the hazard is considered cleared and the moving vehicle 10 may move within a critically hazardous area without being automatically stopped.

In some embodiments, the hazard is considered cleared only during a predetermined duration. Thus, if the moving vehicle 10 does not move away or out from the critically hazardous area within the predetermined duration, the moving vehicle 10 is configured to automatically stop.

In some embodiments, the predetermined duration for the moving vehicle 10 to move out or away from the cleared critically hazardous area may be 60 seconds. Thus, the proximity of this specific device 200 to the vehicle 10 won't trigger a slow down or stop of the vehicle 10. Understandably, such duration may be modified to adapt to other scenarios or other needs of the system.

In yet other embodiments, in a similar scenario, the device 100 of the moving vehicle 10 may be configured to send another acknowledgment request to the devices 100, 200 within the critically hazardous area prior to the end of the predetermined duration to move away from the said critically hazardous area. Again, if no acknowledgment response is received from the devices 100, 200 within the critically hazardous area prior to the end of the predetermined duration, the moving vehicle 10 is stopped.

In some embodiments, the context-aware collision devices 200 are incorporated into the cap lamps of the users 20. When the device 200 receives notification of an approaching vehicle, an alarm is generated on the device 200. In some embodiments, the cap lamp may start to flash to indicate to the user 20 that an acknowledgment request has been received. If the user 20 is in a safe location or indicate that he is in a safe location, the device 200 is configured to send an acknowledgment response to the device 100 of the moving vehicle 10.

As an example, the user 20 may toggle the cap lamp on, toggle the cap lamp off and toggle the cap lamp on again to trigger the device 200 to send the acknowledgement response to the moving vehicle 10. Understandably, any other method for triggering the communication of an acknowledgment response to the moving vehicle 10 are within the scope of the present invention. As an example, any other sequence of toggling the cap lamp on and/or off may be used or the cap lamp may comprise one or more buttons adapted to send the acknowledgment response to the moving vehicle 10.

In examples where more than one user 20 in a group of users 20 within a range that the moving vehicle 10 will cross receive an acknowledgement request, if all the users 20 send the acknowledgement response to the moving vehicle 10, then the vehicle will be able to pass through the group, in proximity of the users 20, without slowing down or stopping.

In examples where another vehicle 30 is within a range that the moving vehicle 10 will cross, the device 100 of the other vehicle 30 is configured to receive the acknowledgment request. In some embodiments, the other vehicle 30 comprises a module or unit comprising an interface configured to display the reception of an acknowledgment request. In such embodiments, the interface is configured for a passenger of the vehicle 30 to trigger the communication of a response to the acknowledgement request to the device 100 of the moving vehicle 10. The interface may be any type of known user interface device such a button-based interface, touch-based interface and/or using gestural recognition technologies.

In examples where more than one user 20 and/or vehicles 30 are within a range that the moving vehicle 10 will cross and receive an acknowledgement request, if all the users 20 and/or vehicles 30 send the acknowledgement response to the moving vehicle 10, then the vehicle will be able to pass through the group of users 20 and vehicles 30, in proximity of the users 20 and/or vehicles 30, without slowing down or stopping.

The method may further comprise automatically detecting that the user 20 or vehicle 30 is within a safe area such as through geo-localization or any other mean to determine that the user 20 or vehicle is within a safe zone.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method in a second collision-avoidance device associated with a moving vehicle, the method comprising:

detecting a first collision-avoidance device associated with a person or with another vehicle;
upon detecting the first collision-avoidance device, sending an acknowledgement request to the first collision-avoidance device;
determining a context as a function of a reception or a non-reception of an acknowledgment from the first collision-avoidance device within a predetermined duration, wherein the acknowledgement is indicative of the person or the other vehicle being in a safe location; and
controlling a movement of the moving vehicle based on the determined context,
wherein determining the context as the function of the reception or the non-reception of the acknowledgment from the first collision-avoidance device within the predetermined duration includes determining the context as being hazardous upon not receiving the acknowledgment from the first collision-avoidance device prior to the end of the predetermined duration, and
wherein controlling the movement of the moving vehicle based on the determined context includes slowing the movement of the moving vehicle when the context is determined as being hazardous.

2. The method of claim 1, wherein detecting the first collision-avoidance device associated with the person or with the other vehicle includes detecting the first collision-avoidance device when the first collision-avoidance device is within a predetermined communication range.

3. The method of claim 1, further comprising displaying a time remaining for the predetermined duration.

4. A method in a second collision-avoidance device associated with a moving vehicle, the method comprising:
detecting a first collision-avoidance device associated with a person or with another vehicle;
upon detecting the first collision-avoidance device, sending an acknowledgement request to the first collision-avoidance device;
determining a context as a function of a reception or a non-reception of an acknowledgment from the first collision-avoidance device within a predetermined duration, wherein the acknowledgement is indicative of the person or the other vehicle being in a safe location; and
controlling a movement of the moving vehicle based on the determined context,
wherein determining the context as the function of the reception or the non-reception of the acknowledgment from the first collision-avoidance device within the predetermined duration includes determining the context as being critically hazardous upon not receiving the acknowledgment from the first collision-avoidance device after the end of the predetermined duration, and
wherein controlling the movement of the moving vehicle based on the determined context includes stopping the movement of the moving vehicle when the context is determined as being critically hazardous.

5. The method of claim 4, wherein detecting the first collision-avoidance device associated with the person or with the other vehicle includes detecting the first collision-avoidance device when the first collision-avoidance device is within a predetermined communication range.

6. The method of claim 4, further comprising displaying a time remaining for the predetermined duration.

7. A second collision-avoidance device configured to be associated with a vehicle, the second collision-avoidance device being configured to:
detect a first collision-avoidance device associated with a person or with another vehicle;
upon detecting the first collision-avoidance device, send an acknowledgement request to the first collision-avoidance device;
determine a context as a function of a reception or a non-reception of an acknowledgment from the first collision-avoidance device within a predetermined duration, wherein the acknowledgement is indicative of the person or the other vehicle being in a safe location; and
control a movement of the vehicle based on the determined context,
wherein when determining the context as the function of the reception or the non-reception of the acknowledgment from the first collision-avoidance device within the predetermined duration, the second collision-avoidance device is further configured to determine the context as being hazardous upon not receiving the acknowledgment from the first collision-avoidance device prior to the end of the predetermined duration, and
wherein when controlling the movement of the vehicle based on the determined context, the second collision-avoidance device is further configured to slow the movement of the vehicle when the context is determined as being hazardous.

8. The second collision-avoidance device of claim 7, wherein to detect the first collision-avoidance device associated with the person or with the other vehicle, the second collision-avoidance device is configured to detect the first collision-avoidance device when the first collision-avoidance device is within a predetermined communication range.

9. The second collision-avoidance device of claim 7, further configured to display a time remaining for the predetermined duration.

10. A second collision-avoidance device configured to be associated with a vehicle, the second collision-avoidance device being configured to:
detect a first collision-avoidance device associated with a person or with another vehicle;
upon detecting the first collision-avoidance device, send an acknowledgement request to the first collision-avoidance device;
determine a context as a function of a reception or a non-reception of an acknowledgment from the first collision-avoidance device within a predetermined duration, wherein the acknowledgement is indicative of the person or the other vehicle being in a safe location; and
control a movement of the vehicle based on the determined context,
wherein when determining the context as the function of the reception or the non-reception of the acknowledgment from the first collision-avoidance device within the predetermined duration, the second collision-avoidance device is further configured to determine the context as being critically hazardous upon not receiving the acknowledgment from the first collision-avoidance device after the end of the predetermined duration, and
wherein when controlling the movement of the vehicle based on the determined context, the second collision-avoidance device is further configured to stop the movement of the vehicle when the context is determined as being critically hazardous.

11. The second collision-avoidance device of claim 10, wherein to detect the first collision-avoidance device associated with the person or with the other vehicle, the second collision-avoidance device is configured to detect the first collision-avoidance device when the first collision-avoidance device is within a predetermined communication range.

12. The second collision-avoidance device of claim 10, further configured to display a time remaining for the predetermined duration.

\* \* \* \* \*